United States Patent
Yu et al.

(10) Patent No.: US 11,595,386 B2
(45) Date of Patent: Feb. 28, 2023

(54) METHOD, ELECTRONIC DEVICE AND COMPUTER PROGRAM PRODUCT FOR STORAGE MANAGEMENT

(71) Applicant: EMC IP Holding Company LLC, Hopkinton, MA (US)

(72) Inventors: Ying Yu, Chengdu (CN); Jing Li, Chengdu (CN); Ming Yue, Chengdu (CN); Jia Huang, Chengdu (CN); Nan Wang, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 116 days.

(21) Appl. No.: 17/159,715

(22) Filed: Jan. 27, 2021

(65) Prior Publication Data

US 2022/0086149 A1 Mar. 17, 2022

(30) Foreign Application Priority Data

Sep. 16, 2020 (CN) .......................... 202010973787.5

(51) Int. Cl.
*G06F 15/16* (2006.01)
*H04L 9/40* (2022.01)
*H04L 67/1097* (2022.01)

(52) U.S. Cl.
CPC ........ *H04L 63/0876* (2013.01); *H04L 63/102* (2013.01); *H04L 63/145* (2013.01); *H04L 63/20* (2013.01); *H04L 67/1097* (2013.01)

(58) Field of Classification Search
CPC . H04L 63/0876; H04L 63/102; H04L 63/145; H04L 63/20; H04L 67/1097
USPC .............................................. 709/229; 726/24
See application file for complete search history.

(56) References Cited

U.S. PATENT DOCUMENTS

| 11,086,994 | B2 | 8/2021 | Gahlot et al. | |
|---|---|---|---|---|
| 2004/0111641 | A1* | 6/2004 | Oshima | H04L 63/102 726/1 |
| 2004/0198319 | A1* | 10/2004 | Whelan | H04W 12/35 455/411 |
| 2008/0282338 | A1* | 11/2008 | Beer | H04L 63/1408 726/22 |
| 2009/0044024 | A1 | 2/2009 | Oberheide et al. | |
| 2010/0115578 | A1* | 5/2010 | Nice | G06F 21/31 726/1 |
| 2012/0079596 | A1 | 3/2012 | Thomas et al. | |
| 2016/0366167 | A1 | 12/2016 | Yumer | |
| 2021/0288981 | A1* | 9/2021 | Numainville | H04L 63/1441 |

\* cited by examiner

*Primary Examiner* — Liang Che A Wang
(74) *Attorney, Agent, or Firm* — BainwoodHuang (57) ABSTRACT

Techniques for storage management involve: receiving, at a storage server, an access request for target data from a client, wherein the access request occurs in a session between the storage server and the client; determining, based on attribute information of the client, security information of the session, wherein the security information indicates whether the session is subjected to antivirus protection; and executing, based on the security information, an access operation specified by the access request on the target data. Therefore, the performance of the storage server can be improved while the security of the storage server is ensured.

19 Claims, 4 Drawing Sheets

METHOD, ELECTRONIC DEVICE AND COMPUTER PROGRAM PRODUCT FOR STORAGE MANAGEMENT

CROSS-REFERENCE TO RELATED APPLICATION

This application claims priority to Chinese Patent Application No. CN202010973787.5, on file at the China National Intellectual Property Administration (CNIPA), having a filing date of Sep. 16, 2020, and having "METHOD, ELECTRONIC DEVICE AND COMPUTER PROGRAM PRODUCT FOR STORAGE MANAGEMENT" as a title, the contents and teachings of which are herein incorporated by reference in their entirety.

TECHNICAL FIELD

Embodiments of the present disclosure relate generally to storage management, and in particular, to a method, an electronic device, and a computer program product for storage management.

BACKGROUND

With the development of information technologies, more and more data are stored in a storage system, leading to higher and higher requirements for the security and the access performance of the storage system. In the storage system, when the storage server receives an access request for target data from a client, in order to prevent malicious operations from the client and ensure the security of data on the storage server, third-party antivirus software is sometimes used to identify and eliminate viruses. Although this ensures the security of the storage system, it will result in a decrease in the access performance of the storage system.

SUMMARY OF THE INVENTION

Embodiments of the present disclosure provide a method, an electronic device, and a computer program product for storage management.

In a first aspect of the present disclosure, a method for storage management is provided. The method includes: receiving, at a storage server, an access request for target data from a client, wherein the access request occurs in a session between the storage server and the client; determining, based on attribute information of the client, security information of the session, wherein the security information indicates whether the session is subjected to antivirus protection; and executing, based on the security information, an access operation specified by the access request on the target data.

In a second aspect of the present disclosure, an electronic device is provided. The device includes at least one processing unit and at least one memory. The at least one memory is coupled to the at least one processing unit and stores instructions configured to be executed by the at least one processing unit. The instructions, when executed by at least one processing unit, cause the device to perform actions, and the actions include: receiving, at the storage server, an access request for target data from a client, wherein the access request occurs in a session between the storage server and the client; determining, based on attribute information of the client, security information of the session, wherein the security information indicates whether the session is subjected to antivirus protection; and executing, based on the security information, an access operation specified by the access request on the target data.

In a third aspect of the present disclosure, a computer program product is provided. The computer program product is tangibly stored on a non-transitory computer-readable medium and includes machine-executable instructions; and the machine-executable instructions, when executed, cause a machine to perform any step of the method described according to the first aspect of the present disclosure.

The summary is provided to introduce the selection of concepts in a simplified form, which will be further described in the detailed description below. The summary is neither intended to identify key features or essential features of the present disclosure, nor intended to limit the scope of the present disclosure.

BRIEF DESCRIPTION OF THE DRAWINGS

The above and other objectives, features, and advantages of the present disclosure will become more apparent through a more detailed description of example embodiments of the present disclosure with reference to the accompanying drawings. In the example embodiments of the present disclosure, the same reference numerals generally represent the same components.

In the accompanying drawings, the same or corresponding numerals represent the same or corresponding parts.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. Although the preferred embodiments of the present disclosure are shown in the accompanying drawings, it should be understood that the present disclosure can be implemented in various forms and should not be limited by the embodiments set forth herein. Rather, these embodiments are provided to make the present disclosure more thorough and complete and to fully convey the scope of the present disclosure to those skilled in the art.

The term "include" and its variants as used herein indicate open-ended inclusion, that is, "including, but not limited to." Unless specifically stated, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

Traditionally, in a storage system, a storage server (such as a Network Attached Storage (NAS) server) can use an antivirus agent to provide an antivirus solution to a client (such as a Common Internet File System (CIFS) client) using the storage server. The antivirus agent may use a communication protocol such as a Server Message Block (SMB) protocol for communication, and use a virus detector such as third-party antivirus software to identify and eliminate a virus to prevent the virus from infecting data on the storage system.

For example, after the storage server receives an access request for target data from a client (such as an access request for writing the target data to create a new file or update an existing file), the storage server will use an antivirus agent to send to a virus detector a request for performing virus detection on the target data. After receiving the request for performing the virus detection on the target data, the virus detector will access and detect the target data, and return to the storage server a response indicating whether the target data is threatened by a virus. The storage server will determine, based on the received response, whether to execute an access operation specified by the access request on the target data. For example, if the response indicates that the target data is not threatened by the virus, the target data may be written to the storage server. Otherwise, the storage server will delete the target data to prevent virus infection.

This antivirus solution can reduce the opportunity that a malicious client stores virus-infected target data on the storage server. However, due to the execution of many additional operations (for example, the storage server sends the request to the virus detector, the virus detector accesses the target data, and the virus detector sends the response to the storage server), the access or input and output performance of the storage system will be significantly reduced.

According to an example embodiment of the present disclosure, an improved solution for storage management is proposed. In this solution, at the storage server, an access request for target data from a client is received. The access request occurs in a session between the storage server and the client. Security information of the session is determined based on attribute information of the client, and the security information indicates whether the session is subjected to antivirus protection. An access operation specified by the access request is executed on the target data based on the security information.

In this way, this solution determines whether the session is subjected to the antivirus protection based on the attribute information of the client, and in the case that the session is subjected to the antivirus protection, an additional operation of a virus detector detecting the target data is omitted, which can ensure the security of the storage server and improve the performance of the storage server. In addition, since the virus detector does not need to detect the target data when the session is subjected to the antivirus protection, the traffic generated in order to detect the security of the target data on the network is reduced.

Figure 1:
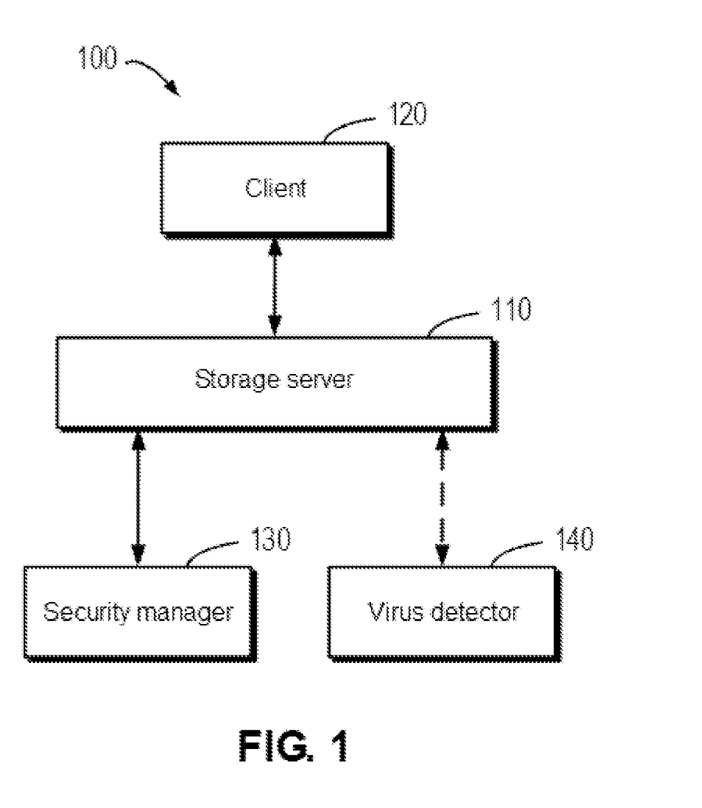
FIG. 1 is a schematic diagram of an example of a storage management environment in which some embodiments of the present disclosure can be implemented.

In the following text, specific examples of this solution will be described in more detail with reference to FIG. 1 to FIG. 4. FIG. 1 is a schematic diagram of an example of storage management environment 100 according to some embodiments of the present disclosure. Storage management environment 100 includes storage server 110, client 120, security manager 130, and virus detector 140.

Storage server 110 may be configured to store data, and may be any device with storage capabilities, such as a network-attached storage server, a rack server, a tower server, a blade server, an edge server, a mainframe, a personal computer, a distributed computing system, cloud, etc.

Client 120 may be configured to execute an access operation on storage server 110. In some embodiments, client 120 may send an access request for the target data to storage server 110, so that storage server 110 executes the access operation specified by the access request on the target data. For example, client 120 may request to write or store the target data on storage server 110, or update the target data. Client 120 may be any computing device, such as a general-purpose network file system client, a desktop computer, a notebook computer, a tablet computer, a personal computer, and a digital assistant.

Before storage server 110 executes the access operation specified by the access request on the target data, storage server 110 needs to determine the security of client 120. To this end, storage server 110 may use security manager 130 to determine the security of client 120. Security manager 130 may provide to storage server 110 information of antivirus software installed on client 120. This is because the antivirus software on client 120 usually has two installation modes: a managed mode and a non-managed mode. In the managed mode, client 120 will communicate with security manager 130, so that security manager 130 can know a status of the antivirus software on client 120.

In most cases, the antivirus software on client 120 is installed in the managed mode, so storage server 110 can determine the security of client 120 based on the information of the antivirus software on client 120 provided by security manager 130. If it is determined that client 120 is sufficiently protected by the antivirus software and is secure, it can be considered that the access request for the target data from client 120 is also secure. The reason is that if client 120 tries to store the target data into storage server 110, local antivirus software on client 120 will perform virus detection on the target data. In this case, if the target data is infected by a virus, the local antivirus software will delete or isolate the target data. Therefore, storage server 110 does not need to perform the virus detection on the target data again.

However, if it is determined that client 120 is not sufficiently protected by the antivirus software, or since the antivirus software on client 120 is installed in the non-managed mode or even no antivirus software is installed, storage server 110 can determine that client 120 is not secure. In this case, storage server 110 will use virus detector 140 to perform the virus detection on the target data. Virus detector 140 may be any device with virus recognition and processing capabilities, such as any computing device with an antivirus engine, and antivirus software.

It should be understood that, in some embodiments, the access request occurs in a session between storage server 110 and client 120. Such a session can follow any appropriate communication protocol, such as a server message block protocol. Since the access request occurs in the session between storage server 110 and client 120, in order to save resources, it is not necessary to determine the security of client 120 for each communication in the session, but the security of client 120 is determined, when the session is initiated, as the security of all communications in this session.

In this way, by means of omitting an additional operation of virus detector 140 performing the virus detection on the target data in the case that client 120 or the session is subjected to antivirus protection (e.g., via specialized circuitry), the performance of storage server 110 can be improved while the security of storage server 110 is ensured. In addition, since the work of virus detection on the target data is executed by secure client 120, the cost of using virus detector 140 is reduced. Further, since virus detector 140 does not need to detect the target data in the case that client 120 or the session is subjected to the antivirus protection, the traffic generated in order to detect the security of the target data on the network is reduced.

Figure 2:
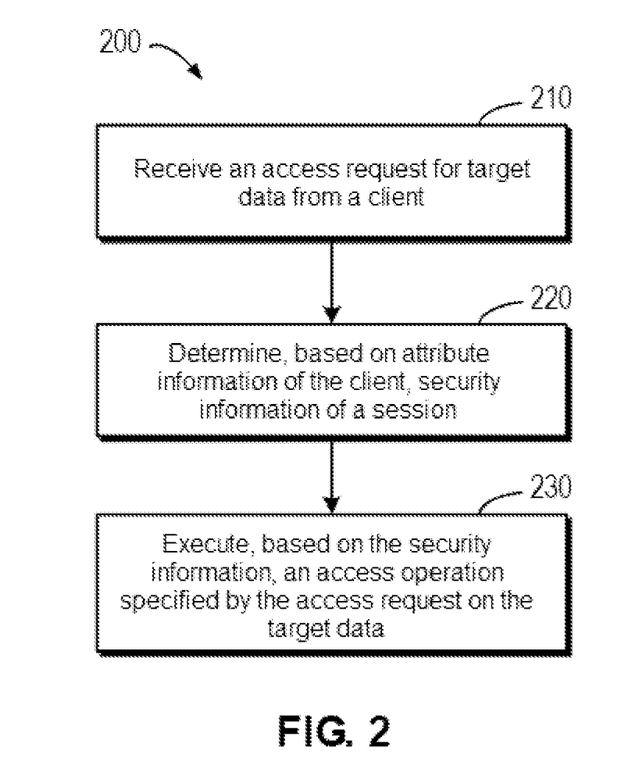
FIG. 2 is a flowchart of an example of a method for storage management according to some embodiments of the present disclosure.

The operations performed on storage server 110 will be described in detail below with reference to FIG. 2 to FIG. 4. FIG. 2 is a flowchart of method 200 for storage management according to some embodiments of the present disclosure. For example, method 200 may be implemented by storage server 110 as shown in FIG. 1. It should be understood that method 200 may further include additional steps that are not shown and/or may omit the shown steps, and the scope of the present disclosure is not limited in this aspect.

At 210, storage server 110 receives an access request for target data from client 120. For example, client 120 may request to write or store the target data on storage server 110, or update the target data. The access request occurs in a session between storage server 110 and client 120. Such a session can follow any appropriate communication protocol, such as a server message block protocol.

At 220, storage server 110 determines security information of the session based on attribute information of client 120. The security information indicates whether the session is subjected to antivirus protection. In some embodiments, the attribute information may include an address (such as an IP address, an MAC address, etc.) of client 120, an identifier (such as a client name) of client 120, a user identifier (such as a user name) of a user initiating the access request, etc. It should be understood that the address of client 120 may be any information used to address client 120, and the identifier of client 120 and the user identifier of the user may be any information used to uniquely identify client 120 and the user.

In some embodiments, storage server 110 may send attribute information to security manager 130 associated with client 120. In some embodiments, storage server 110 may determine, from the attribute information, the address of client 120 and the identifier of client 120, and send the address of client 120 and the identifier of client 120 to security manager 130.

Security manager 130 may determine information of the antivirus software installed on the client corresponding to the attribute information, and provide the information to storage server 110. In some embodiments, storage server 110 may use, for example, a Restful API to send a query containing the attribute information to security manager 130, so as to acquire the information of the antivirus software. In some embodiments, the information of the antivirus software may include an identifier of the antivirus software, update time of the antivirus software, and functions enabled in the antivirus software.

Storage server 110 may determine the security information based on the received information of the antivirus software. In some embodiments, storage server 110 may determine whether the identifier of the antivirus software matches an identifier of specified antivirus software. In addition, storage server 110 may determine whether the update time of the antivirus software exceeds a threshold time, for example, whether the antivirus software is of the latest version. Further, storage server 110 may determine whether the enabled function is a specified function, for example, whether the function for performing virus detection on a network drive is enabled. The specified antivirus software, the threshold time, and the specified function may be specified by an administrator of storage server 110 or automatically determined according to a required security level.

In the case that the information of the antivirus software meets specified conditions, such as matching the identifier of the specified antivirus software, being of the latest version, or enabling the specified function, the security information may be determined to indicate that the session is subjected to the antivirus protection. Otherwise, in the case that the information of the antivirus software does not meet all or any of the specified conditions, the security information may be determined to indicate that the session is not subjected to the antivirus protection.

At 230, storage server 110 performs, based on the security information, the access operation specified by the access request on the target data. Specifically, if the security information indicates that the session is subjected to the antivirus protection, storage server 110 may execute the access operation specified by the access request on the target data. For example, storage server 110 may write or store the target data, or update the target data.

If the security information indicates that the session is not subjected to the antivirus protection, storage server 110 will use virus detector 140 to perform virus detection on the target data. For example, storage server 110 may send a request for performing the virus detection on the target data to virus detector 140. After receiving the request for performing the virus detection on the target data, virus detector 140 can access and detect the target data, and return to storage server 110 a response indicating whether the target data is threatened by a virus. Storage server 110 may determine whether to execute the access operation specified by the access request on the target data based on the received response.

If the response indicates that the target data is not threatened by the virus, storage server 110 may execute the access operation specified by the access request on the target data. If the response indicates that the target data is threatened by the virus, storage server 110 will not execute the access operation specified by the access request on the target data. Further, storage server 110 may also delete the target data to prevent the virus from the target data from infecting storage server 110.

In this way, by means of omitting an additional operation of virus detector 140 detecting the target data in the case that the session is subjected to the antivirus protection (e.g., via specialized circuitry), the performance of storage server 110 can be improved while the security of storage server 10 is ensured. In addition, since the work of virus detection on the target data is executed by secure client 120, the cost of using virus detector 140 is reduced. Further, since virus detector 140 does not need to detect the target data in the case that the session is subjected to the antivirus protection, the traffic generated in order to detect the security of the target data on the network is reduced.

In example storage management method 200 shown in FIG. 2, the information of the antivirus software provided by security manager 130 is used to ensure the security of storage server 110. In some embodiments, additional measures may also be used to further ensure the security. For example, the security can be further ensured by means of determining whether the user initiating the access request is a trusted user (e.g., via specialized circuitry). In the following text, example storage management method 300 will be described with reference to FIG. 3.

Figure 3:
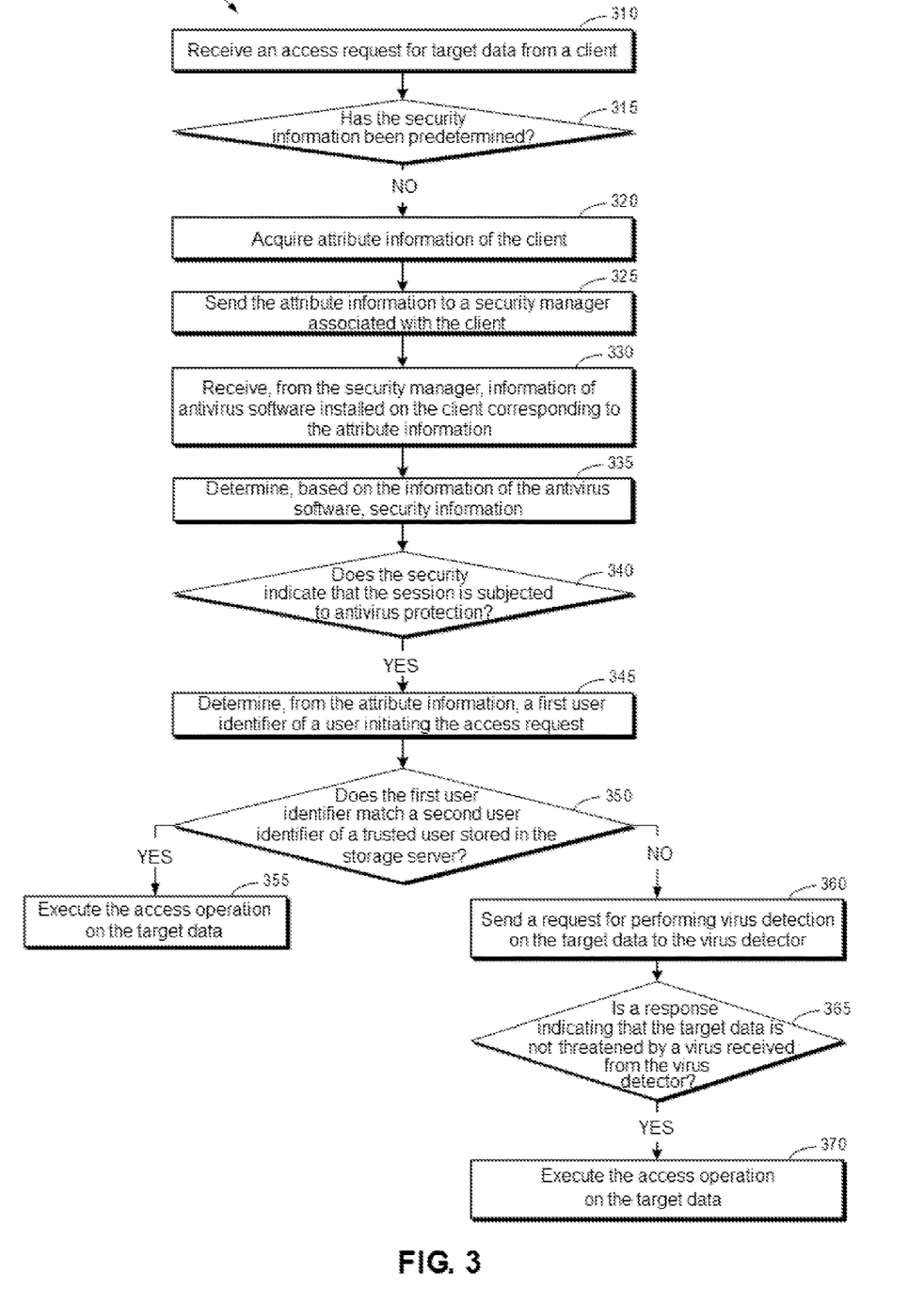
FIG. 3 is a flowchart of another example of a method for storage management according to some embodiments of the present disclosure.

FIG. 3 is a flowchart of another example of method 300 for storage management according to some embodiments of the present disclosure. For example, method 300 may be implemented by storage server 110 as shown in FIG. 1. It should be understood that method 300 may also include additional steps not shown and/or may omit the steps shown, and that the scope of the present disclosure is not limited in this respect.

At 310, storage server 110 may receive an access request for target data from client 120. The access request occurs in a session between storage server 110 and client 120.

At 315, storage server 110 may determine whether security information has been predetermined. In some embodiments, before determining whether the security information has been predetermined, storage server 110 may also determine whether it is necessary to determine the security information. Without the need to determine the security information, storage server 110 may directly use virus detector 140 to perform virus detection on the target data, and execute an access operation on the target data based on a detection result.

In the case that the security information needs to be determined, storage server 110 may determine whether the security information has been predetermined. In some embodiments, for a session of which the security information has been determined, storage server 110 may store the session in association with its security information. In this case, storage server 110 may acquire the corresponding security information based on an identifier of the session. Therefore, there is no need to determine the security of the session for each communication in the session, but the security of the session is determined when the session is initiated, thereby saving resources. For example, storage server 110 may maintain a list of sessions. The list of sessions includes session records. The session records include identifiers of the sessions and security information of the sessions. In some embodiments, the list of sessions will be updated over time. For example, when the session is disconnected or overtime (for example, for 10 minutes), the session record can be deleted from the list of sessions.

In the case that the security information has been predetermined, storage server 110 may determine whether the security information indicates that the session is subjected to the antivirus protection. If the security information of the session indicates that the session is subjected to the antivirus protection, storage server 110 may execute the access operation specified by the access request on the target data. If the security information indicates that the session is not subjected to the antivirus protection, storage server 110 may use virus detector 140 to perform virus detection on the target data, and execute the access operation on the target data based on a detection result.

In the case that the security information has not been predetermined, at 320, storage server 110 may acquire attribute information of client 120. In some embodiments, the attribute information may include an address (such as an IP address, an MAC address, etc.) of client 120, an identifier of client 120, a user identifier of a user initiating the access request, etc.

At 325, storage server 110 may send the attribute information to security manager 130 associated with client 120. In some embodiments, storage server 110 may determine, from the attribute information, the address of client 120 and the identifier of client 120, and send the address of client 120 and the identifier of client 120 to security manager 130.

At 330, storage server 110 may receive, from security manager 130, information of the antivirus software installed on client 120 corresponding to the attribute information. At 335, storage server 110 may determine the security information based on the information of the antivirus software. In some embodiments, storage server 110 may determine whether the identifier of the antivirus software matches an identifier of specified antivirus software. In addition, storage server 110 may determine whether the update time of the antivirus software exceeds a threshold time, for example, whether the antivirus software is of the latest version. Further, storage server 110 may determine whether the enabled function is a specified function, for example, whether the function for performing virus detection on a network drive is enabled. The specified antivirus software, the threshold time, and the specified function may be specified by an administrator of storage server 110 or automatically determined according to a required security level.

In the case that the information of the antivirus software meets specified conditions, such as matching the identifier of the specified antivirus software, being of the latest version, or enabling the specified function, the security information may be determined to indicate that the session is subjected to the antivirus protection. Otherwise, in the case that the information of the antivirus software does not meet all or any of the specified conditions, the security information may be determined to indicate that the session is not subjected to the antivirus protection.

At 340, storage server 110 may determine whether the security information indicates that the session is subjected to the antivirus protection. If the security information indicates that the session is not subjected to the antivirus protection, storage server 110 may use virus detector 140 to perform virus detection on the target data, and execute the access operation on the target data based on a detection result. In some embodiments, storage server 110 may also store the session record of the session in the list of sessions. The session record includes the identifier of the session and the security information indicating that the session is not subjected to the antivirus protection.

If the security information indicates that the session is subjected to the antivirus protection, storage server 110 may determine whether the user initiating the access request is a trusted user. For example, storage server 110 may maintain a list of trusted users. User identifiers of trusted users are stored in the list of trusted users.

Before determining whether the user is a trusted user, storage server 110 may also determine whether it is necessary to determine whether the user is a trusted user. In the case that there is no need to determine whether the user is a trusted user, since the session has been determined to be secure, storage server 120 may execute the access operation on the target data. In some embodiments, storage server 110 may also store the session record of the session in the list of sessions. The session record includes the identifier of the session and the security information indicating that the session is subjected to the antivirus protection.

In the case that it is necessary to determine whether the user is a trusted user, at 345, storage server 110 may determine, from the attribute information, a user identifier (hereinafter referred to as the "first user identifier") of the user initiating the access request. At 350, storage server 110 may determine whether the first user identifier matches the user identifier (hereinafter referred to as "second user identifier") of the trusted user stored in storage server 110. If the first user identifier matches the second user identifier, at 355, storage server 110 may execute the access operation specified by the access request on the target data.

If the first user identifier does not match the second user identifier, at 360, storage server 110 may send a request for performing virus detection on the target data to virus detector 140. At 365, storage server 110 may determine whether a response indicating that the target data is not threatened by a virus is received from virus detector 140. If the response indicating that the target data is not threatened by a virus is received from virus detector 140, at 370, storage server 110 may execute the access operation on the target data.

In this way, based on the security information of the session and the determination of whether the user initiating the access request is a trusted user, an additional operation of virus detector 140 detecting the target data can be omitted, which can ensure the security of storage server 110 and improve the performance of storage server 110. In addition, since the work of virus detection on the target data is executed by secure client 120, the cost of using virus detector 140 is reduced. Further, since virus detector 140 does not need to detect the target data in the case that the session is subjected to the antivirus protection, the traffic generated in order to detect the security of the target data on the network is reduced.

Figure 4:
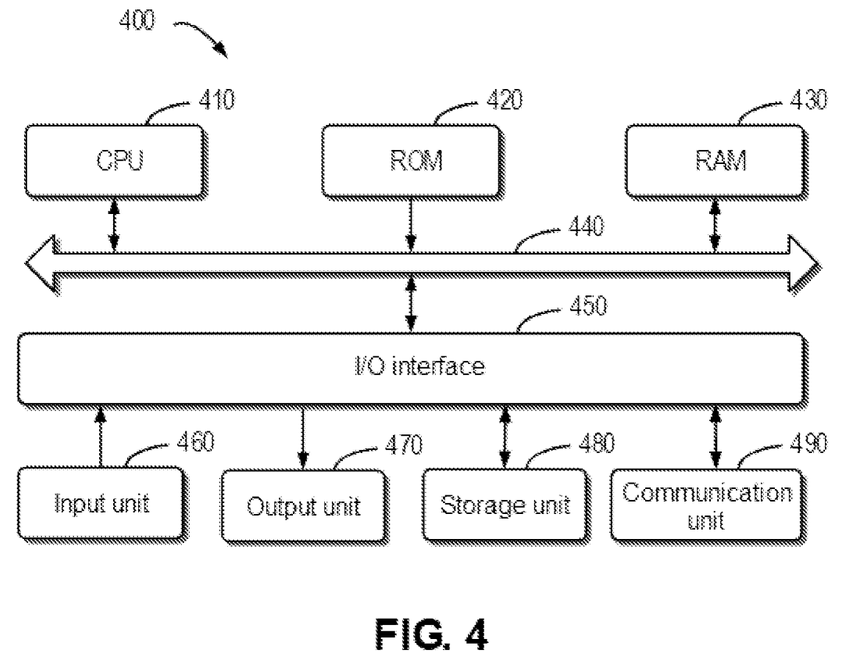
FIG. 4 is a schematic block diagram of an example device that can be configured to implement an embodiment of content of the present disclosure.

FIG. 4 is a schematic block diagram of example device 400 that can be configured to implement an embodiment of the present disclosure. For example, storage system 110 as shown in FIG. 1 may be implemented by device 400. As shown in the figure, device 400 includes central processing unit (CPU) 410 that may perform various appropriate actions and processing according to computer program instructions stored in read-only memory (ROM) 420 or computer program instructions loaded from storage unit 480 to random access memory (RAM) 430. In RAM 430, various programs and data required for the operation of device 400 may also be stored. CPU 410, ROM 420, and RAM 430 are connected to each other through bus 440. Input/output (I/O) interface 450 is also connected to bus 440.

A plurality of components in device 400 are coupled to I/O interface 450, including: input unit 460, such as a keyboard and a mouse; output unit 470, such as various types of displays and speakers; storage unit 480, such as a magnetic disk and an optical disc; and communication unit 490, such as a network card, a modem, and a wireless communication transceiver. Communication unit 490 allows device 400 to exchange information/data with other devices over a computer network such as the Internet and/or various telecommunication networks.

The various processes and processing described above, such as methods 200 and 300, may be implemented by processing unit 410. For example, in some embodiments, methods 200 and 300 may be implemented as a computer software program that is tangibly included in a machine-readable medium such as storage unit 480. In some embodiments, some or all of the computer programs may be loaded and/or installed onto device 400 through ROM 420 and/or communication unit 490. When the computer program is loaded into RAM 430 and executed by CPU 410, one or more actions of methods 200 and 300 described above may be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. For example, the computer-readable storage medium may be, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include: a portable computer disk, a hard disk, an RAM, an ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium used here is not construed as transient signals per se, such as radio waves or other freely propagating electromagnetic waves, electromagnetic waves propagating through waveguides or other transfer media (for example, optical pulses through fiber-optic cables), or electrical signals transmitted through electrical wires.

The computer-readable program instructions described herein may be downloaded from a computer-readable storage medium to various computing/processing devices, or downloaded to an external computer or external storage device via a network such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives a computer-readable program instruction from the network and forwards the computer-readable program instruction for storage in the computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages, such as Java, Smalltalk, and C++, as well as conventional procedural programming languages, such as "C" language or similar programming languages. The computer-readable program instructions may be executed entirely on a user computer, executed partly on a user computer, executed as a stand-alone software package, executed partly on a user computer while executed partly on a remote computer, or executed entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), can be customized by utilizing status information of the computer-readable program instructions. The electronic circuit may execute the computer-readable program instructions to implement various aspects of the present disclosure.

Various aspects of the present disclosure are described here with reference to flowcharts and/or block diagrams of the methods, the apparatuses (systems), and the computer program products according to the embodiments of the present disclosure. It should be understood that each block in the flowcharts and/or block diagrams and a combination of blocks in the flowcharts and/or block diagrams may be implemented by computer-readable program instructions.

The computer-readable program instructions may be provided to a processing unit of a general purpose computer, a special purpose computer, or another programmable data processing apparatus to produce a machine, such that the instructions, when executed by the processing unit of the computer or another programmable data processing apparatus, generate an apparatus for implementing the functions/actions specified in one or more blocks in the flowcharts and/or block diagrams. These computer-readable program instructions may also be stored in a computer-readable storage medium, to cause a computer, a programmable data processing apparatus, and/or other devices to work in a specific manner, such that the computer-readable medium storing the instructions includes an article of manufacture that contains instructions for implementing various aspects of the functions/actions specified in one or more blocks in the flowcharts and/or block diagrams.

The computer-readable program instructions may also be loaded onto a computer, other programmable data processing apparatuses, or other devices, so that a series of operating steps are performed on the computer, other programmable data processing apparatuses, or other devices to produce a computer-implemented process, so that the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functionalities, and operations of possible implementations of the system, the method, and the computer program product according to a plurality of embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions marked in the blocks may also occur in an order different from that marked in the accompanying drawings. For example, two successive blocks may actually be performed basically in parallel, or they may be performed in an opposite order sometimes, depending on the functions involved. It should be further noted that each block in the block diagrams and/or flowcharts as well as a combination of blocks in the block diagrams and/or flowcharts may be implemented by using a special hardware-based system for executing specified functions or actions or by a combination of special hardware and computer instructions.

The embodiments of the present disclosure have been described above. The above description is illustrative, rather than exhaustive, and is not limited to the disclosed embodiments. Numerous modifications and changes are apparent to those of ordinary skill in the art without departing from the scope and spirit of the various illustrated embodiments. The selection of terms as used herein is intended to best explain the principles and practical applications of the various embodiments or technical improvements to technologies on the market, or to enable other persons of ordinary skill in the art to understand the various embodiments disclosed herein.

The invention claimed is:

1. A method for storage management, comprising:
   receiving, at a storage server, an access request for target data from a client, wherein the access request occurs in a session between the storage server and the client;
   determining, based on attribute information of the client, security information of the session, wherein the security information indicates whether the session is subjected to antivirus protection; and
   executing, based on the security information, an access operation specified by the access request on the target data;
   determining a first user ID of the user initiating the access request from the attribute information; and
   determining that the first user ID does not match a second user ID of a trusted user stored in the storage server;
   sending a request for performing virus detection on the target data to a virus detector in response to determining that the first user ID does not match the second user ID; and
   wherein executing the access operation is in response to receiving, from the virus detector, a response indicating that the target data is not threatened by a virus.

2. The method according to claim 1, further comprising:
   determining that the security information has not been predetermined; and
   acquiring the attribute information in response to determining that the security information has not been predetermined.

3. The method according to claim 1, wherein the attribute information comprises at least one of:
   an Internet protocol (IP) address of the client,
   a multi-access control (MAC) address of the client,
   an identifier of the client, and
   a user identifier (ID) of a user initiating the access request.

4. The method according to claim 1, wherein the determining the security information comprises:
   sending the attribute information to a security manager associated with the client;
   receiving, from the security manager, information of antivirus software installed on the client corresponding to the attribute information; and
   determining, based on the information of the antivirus software, the security information.

5. The method according to claim 4, wherein the information of the antivirus software comprises at least one of:
   an identifier of the antivirus software,
   update time of the antivirus software, and
   a function enabled in the antivirus software.

6. The method according to claim 5, wherein the determining the security information comprises determining at least one of:
   whether the identifier of the antivirus software matches an identifier of specified antivirus software,
   whether the update time exceeds a threshold time, and
   whether the enabled function is a specified function.

7. The method according to claim 1, further comprising:
determining credibility of a second user in response to security information of a second session indicating that the second session is subjected to the antivirus protection; and
executing, based on the credibility, a second access operation on the target data.

8. The method according to claim 7, wherein the determining the credibility comprises:
determining a first user ID of the second user initiating a second access request from the attribute information; and
determining that the first user ID matches a second user ID of a trusted user stored in the storage server; and
wherein executing the second access operation is in response to determining that the first user ID matches the second user ID.

9. An electronic device, comprising:
at least one processing unit; and
at least one memory, wherein the at least one memory is coupled to the at least one processing unit and stores instructions configured to be executed by the at least one processing unit, and the instructions, when executed by the at least one processing unit, cause the device to perform actions comprising:
receiving, at a storage server, an access request for target data from a client, wherein the access request occurs in a session between the storage server and the client;
determining, based on attribute information of the client, security information of the session, wherein the security information indicates whether the session is subjected to antivirus protection; and
executing, based on the security information, an access operation specified by the access request on the target data;
determining a first user ID of the user initiating the access request from the attribute information; and
determining that the first user ID does not match a second user ID of a trusted user stored in the storage server;
sending a request for performing virus detection on the target data to a virus detector in response to determining that the first user ID does not match the second user ID; and
wherein executing the access operation is in response to receiving, from the virus detector, a response indicating that the target data is not threatened by a virus.

10. The device according to claim 9, wherein the actions further comprise:
determining that the security information has not been predetermined; and
acquiring the attribute information in response to determining that the security information has not been predetermined.

11. The device according to claim 9, wherein the attribute information comprises at least one of:
an IP address of the client,
an MAC address of the client,
an identifier of the client, and
a user ID of a user initiating the access request.

12. The device according to claim 9, wherein the determining the security information comprises:
sending the attribute information to a security manager associated with the client;
receiving, from the security manager, information of antivirus software installed on the client corresponding to the attribute information; and
determining, based on the information of the antivirus software, the security information.

13. The device according to claim 12, wherein the information of the antivirus software comprises at least one of:
an identifier of the antivirus software,
update time of the antivirus software, and
a function enabled in the antivirus software.

14. The device according to claim 13, wherein the determining the security information comprises determining at least one of:
whether the identifier of the antivirus software matches an identifier of specified antivirus software,
whether the update time exceeds a threshold time, and
whether the enabled function is a specified function.

15. The device according to claim 9, further comprising:
determining credibility of a second user in response to security information of a second session indicating that the second session is subjected to the antivirus protection; and
executing, based on the credibility, a second access operation on the target data.

16. The device according to claim 15, wherein the determining the credibility comprises:
determining a first user ID of the second user initiating a second access request from the attribute information; and
determining that the first user ID matches a second user ID of a trusted user stored in the storage server; and
wherein executing the second access operation is in response to determining that the first user ID matches the second user ID.

17. A computer program product having a non-transitory computer readable medium which stores a set of instructions to perform storage management; the set of instructions, when carried out by computerized circuitry, causing the computerized circuitry to perform a method of:
receiving, at a storage server, an access request for target data from a client, wherein the access request occurs in a session between the storage server and the client;
determining, based on attribute information of the client, security information of the session, wherein the security information indicates whether the session is subjected to antivirus protection; and
executing, based on the security information, an access operation specified by the access request on the target data;
determining a first user ID of the user initiating the access request from the attribute information; and
determining that the first user ID does not match a second user ID of a trusted user stored in the storage server;
sending a request for performing virus detection on the target data to a virus detector in response to determining that the first user ID does not match the second user ID; and
wherein executing the access operation is in response to receiving, from the virus detector, a response indicating that the target data is not threatened by a virus.

18. The computer program product of claim 17, wherein the method further comprises:
processing other access requests from other clients while concurrently executing the access operation to provide storage management on behalf of multiple clients simultaneously.

19. The computer program product of claim 17, wherein determining the security information of the session includes:
  receiving an indication that a parameter corresponding to a client-side virus detection system is less than a predetermined threshold; and
wherein executing the access operation includes:
  submitting a request for a server-side virus detection system to perform virus detection on the target data; and
  in response to receiving an indication that the target data is safe, writing the target data to the storage server.

* * * * *